3,438,861
PREPARATION OF PHOSPHATIDYLETHANOL-
AMINE FROM E. COLI
Elizabeth Work and Kenneth William Knox, London,
England, assignors to Twyford Laboratories Limited
No Drawing. Filed Oct. 14, 1966, Ser. No. 586,645
Claims priority, application Great Britain, Oct. 25, 1965,
45,015/65
Int. Cl. C12d 13/06; C12k 3/00
U.S. Cl. 195—29     8 Claims

ABSTRACT OF THE DISCLOSURE

Phosphatidylethanolamine is prepared by growing a lysine-requiring mutant of E. coli in a suboptimal concentration of lysine, obtaining a cell-free liquid from the resulting culture, precipitating a complex of phospholipid with protein-liposaccharide from the cell-free liquid by dissolving a polar water-immiscible organic compound in the cell-free liquid, separating the precipitated material, and separating phosphatidylethanolamine from the precipitated material.

---

This invention is for improvements in or relating to phosphatidylethanolamine and has particular reference to a process for the preparation thereof in enhanced yields from a soluble complex of phospholipid with protein-lipopolysaccharide.

Phosphatidylethanolamine is a valuable chemical in the biochemical laboratory, being used in tests for clotting of blood and for the formation of active complexes with certain enzymes concerned in the oxidation and biosynthesis of various metabolites. When added as a micelle to aqueous suspensions of lipids or certain water insoluble proteins water-miscible dispersions are produced. These may be of use in the pharmaceutical industry for the production of materials for injection.

Our copending application Ser. No. 575,981, filed Aug. 30, 1966 claims a process for the preparation of a soluble complex of phospholipid with protein-lipopolysaccharide which process comprises growing a lysine-requiring mutant of a Gram-negative species of bacterium in a suboptimal concentration of lysine, obtaining a cell-free liqquid from the resulting culture, precipitating a complex of phospholipid with protein-lipopolysaccharide from the cell-free liquid by dissolving a polar water-immiscible organic compound in the cell-free liquid, separating the precipitated material, removing the organic compound to leave a water-soluble complex of phospholipid with protein-lipopolysaccharide.

The complex of phospholipid with dipoprotein lipopolysaccharide contains approximately 25–28% by weight of solids extractable with organic solvents, and of which approximately 60–75% is phosphatidylethanolamine. It is an object of the present invention to provide a process for the preparation of this phosphatidylethanolamine.

Accordingly the present invention provides a process for the preparation of phosphatidylethanolamine which process comprises growing a dysine-requiring mutant of a Gram-negative species of bacterium in a suboptimal concentration of lysine, obtaining a cell-free liquid from the resulting culture, precipitating a complex of phospholipid with protein-lipopolysaccharide from the cell-free liquid by dissolving a polar water-immiscible organic compound in the cell-free liquid, separating the precipitated material, and separating phosphatidylethanolamine from the precipitated material.

The preferred gram-negative species of bacterium is Escherichia coli which is grown in a suboptimal concentration of lysine under conditions such that diaminopimelic acid accumulates in the culture medium.

The lysine concentration may vary from 20 to 500 mg./litre and the lysine-requiring mutant is preferably grown under conditions of high aeration. The pH of the culture may be from between 5 and 8. The lysine-requiring mutant is preferably grown for from 16 to 48 hours at a temperature of from 25° to 40° C. Normally when lysine-requiring mutants of Escherichia coli are used the fermentation will be stopped at any convenient time except after growth has fiinally ceased.

The culture medium comprises a source of assimilable carbon, a source of assimilable nitrogen, inorganic salts and lysine. The source of assimilable carbon may be one or more carhohydrates such for example as glycerol, mannitol, glucose, sucrose, lactose and/or cane sugar molasses and/or one or more organic acids such for example as fumaric, citric and/or lactic acid. Glycerol is the preferred carbon source. The source of assimilable nitrogen may be, for example, ammonia, ammonium sulphate, ammonium chloride, ammonium phosphate, ammonium carbonate, ammonium acetate, a nitrate or urea. The inorganic salts may be, for example, potassium dihydrogen phosphate, potassium monohydrogen phosphate, magnesium sulphate and sodium sulphate. The lysine which is present in the medium may be added per se or, more usually, in the form of a salt, such for example as the hydrochloride, or in the form of a material containing lysine as for example cornsteep liquor.

A preferred culture medium for the present invention has the composition in grams/litre of: $(NH_4)_2HPO_4$, 15; $KH_2PO_4$, 2; $MgSO_4 \cdot 7H_2O$, 0.05; $Na_2SO_4 \cdot 10H_2O$, 0.1; glycerol 20; L-lysine monohydrochloride 0.06.

The cell-free liquid may be obtained from the culture by, for example, centrifugation and thereafter freeing from bacteria by membrane filtration. The polar water-immiscible organic compound may be a halogenated hydrocarbon such for example as chloroform or trichloroethylene or methylene dichloride and may be added to the cell-free liquid and dissolved therein by agitation.

The lipid complex of the protein-lipopolysaccharide may be precipitated at room temperature directly from the cell-free liquid by addition of chloroform in amounts (determined for each growth) just insufficient to cause separation of a second phase of chloroform (usually up to 7%); alternatively the cell-free liquid can be first concentrated up to 5 times.

When too much chloroform is added and a second phase separates, the yield of precipitate is lowered since some of the phospholipid is extracted into the chloroform. The mixture with chloroform may be agitated and left for at least 15 minutes, precipitated material is preferably separated by centrifugation. If desired, further purification of the complex can be carried out as described in our copending application Ser. No. 575,981, filed Aug. 30, 1966.

Phosphatidylethanolamine is separated from the precipitated material by any method known in the art, for example dissociation can be carried out by treatment of the complex with short chain alcohols (e.g., methanol or tertiary amyl alcohol), bile salts or synthetic detergents (for example, cetavlon, lauryl sulphate or "Triton") or aqueous acetone or aqueous ether. The dissociation is preferably effected by treatment of the freeze-dried complex with methanol at 50° C. If necessary stabilising agents known in the art may be added.

The phosphatidylethanolamine may be purified by any of the methods known in the art such for example as precipitation from benzene with acetone or absorption or chromatography for example on silicic acid or diethylaminoethyl cellulose.

Following is a description by way of example of methods of carrying the invention into effect.

EXAMPLE 1

E. coli strain ATCC 12408 was grown for 26 hours at 37° C. under conditions of high aeration in a sterile medium containing (g./l.) $(NH_4)_2HPO_4$, 15; $KH_2PO_4$, 2; $MgSO_4 \cdot 7H_2O$, 0.05; $Na_2SO_4 \cdot 10H_2O$, 0.1; glycerol 20; L-lysine monohydrochloride 0.06; pH adjusted to 7.0. 480 ml. of the overnight culture was used to inoculate 15 litres of the same medium contained in a stirred fermenter (30 l. capacity). The inoculated medium was incubated at 37° C. and air was passed in at the rate of 5 litres per minute. After 26 hours, the bacterial cells were removed from the culture by centrifugation and the supernatant fluid was freed from bacteria by membrane filtration.

4 Litres of the culture filtrate was stirred vigorously at room temperature for 10 minutes with 2% volume, i.e., 80 ml. of chloroform. The mixture stood overnight, and the resulting precipitate was then separated by centrifugation at 3,500 g. The precipitate was resuspended in 100 ml. of water, and the chloroform removed in a rotary vacuum evaporator at room temperature. The solution on lyophilisation yielded 1.6 g. of complex of phospholipid with protein-lipopolysaccharide. 1.1 g. of this dry complex suspended in 80 ml. methanol was ground in a Potter glass homogeniser and heated at 60° C. for 15 minutes. The suspension was centrifuged and the solid was reextracted with methanol as before, and then with chloroform (80 ml.) at room temperature. The combined extracts were taken to dryness in vacuo; the solid was dissolved in chloroform and filtered into a weighed flask. After removal of all volatile material the weight of chloroform-soluble material was 279 mg. Thin layer chromatography of 60 μg. of this material on Kieselgel G developed with chloroform-methanol acetic acid (65–25–8 parts by volume) showed one main extended spot which correspond in position and chemical reactivity (positive reactions with ninhydrin and Zinzadze's reagent) with phosphatidylethanolamine, and also a small unidentified slower-moving spot showing strong ninhydrin and weak Zinzadze reactions. The material was purified by chromatography on a column (2.5×22 cm.) of diethylaminoethyl cellulose in the acetate form. The absorbent was washed on the column with methanol and chloroform and the material (183 mg.) was applied dissolved in chloroform; 40 ml. fractions were monitored by thin-layer chromatography. A mixture (250 ml.) of chloroform/methanol (9:1 v./v.) washed through yellow pigment but no phospholipid; on changing to chloroform/methanol ratio of 7:3 v./v. all the phosphatidylethanolamine was eluted in a volume of 360 ml. No other material was detected in this fraction, which when taken to dryness weighed 115 mgm. The analysis was as follows: P, 4.15%; N, 1.77%, esterified fatty acid (as hexadocanoic acid) 65% (molar ratios, nitrogen to phosphorous 0.95:1.0; fatty acid to phosphorus 1.9:1.0; theoretical 1:1 and 2:1 respectively). The composition of the fatty acids (as percent total fatty acid) was hexadecanoic 38.5; octadecanoic 34.7; hexadecanoic 16.2; methylene hexadecanoic 6.8; octadecanoic 1.6.

We claim:

1. A process for the preparation of phosphatidylethanolamine which process comprises growing a lysine-requiring mutant of *Escherichia coli* in a suboptimal concentration of lysine, obtaining a cell-free liquid from the resulting culture, precipitating a complex of phospholipid with protein-lipopolysaccharide from the cell-free liquid by dissolving a polar water-immiscible organic compound in the cell-free liquid, separating the precipitated material, and separating phosphatidylethanolamine from the precipitated material.

2. A process as claimed in claim 1 wherein the *Escherichia coli* is grown in a suboptimal concentration of lysine under conditions such that diaminopimelic acid accumulates in the culture medium.

3. A process as claimed in claim 2 wherein the lysine concentration is between 20 and 500 mg./litre and the lysine-requiring mutant is grown under conditions of high aeration.

4. A process as claimed in claim 3 wherein the pH of the culture is between 5 and 8 and the lysine-requiring mutant is grown for 16 to 48 hours at a temperature of from 25° to 40° C.

5. A process as claimed in claim 1 wherein the polar water-immiscible organic compound is a halogenated hydrocarbon.

6. A process as claimed in claim 5 wherein the halogenated hydrocarbon is chloroform, trichlorethylene or methylene dichloride.

7. A process as claimed in claim 1 wherein the phosphatidylethanolamine is separated from the precipitated material by treatment of the complex with short chain alcohols, bile salts, synthetic detergents, aqueous acetone or aqueous ether.

8. A process as claimed in claim 7 wherein the freeze-dried complex is treated with methanol at 60° C.

References Cited

UNITED STATES PATENTS

| | | | |
|---|---|---|---|
| 3,089,821 | 5/1963 | Folkers | 167—78 |
| 3,148,120 | 9/1964 | Westphal | 167—78 |

LIONEL M. SHAPIRO, *Primary Examiner.*

U.S. Cl. X.R.

195—96